Jan. 25, 1966  JEAN-MARIE MASSOUBRE  3,231,000
PNEUMATIC TIRES
Filed Aug. 30, 1963  3 Sheets-Sheet 1

INVENTOR.
JEAN-MARIE MASSOUBRE
BY Brumbaugh, Free, Graves
& Donohue
his ATTORNEYS Jan. 25, 1966     JEAN-MARIE MASSOUBRE     3,231,000
PNEUMATIC TIRES Filed Aug. 30, 1963     3 Sheets-Sheet 2

INVENTOR.
JEAN-MARIE MASSOUBRE
BY Brumbaugh, Free, Graves
& Donohue
his ATTORNEYS

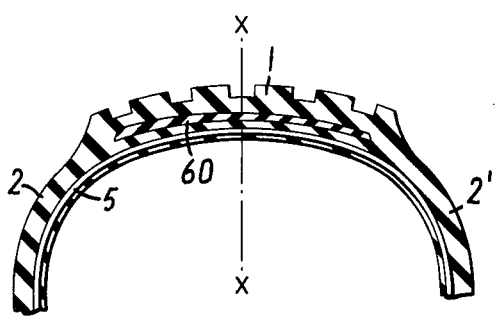
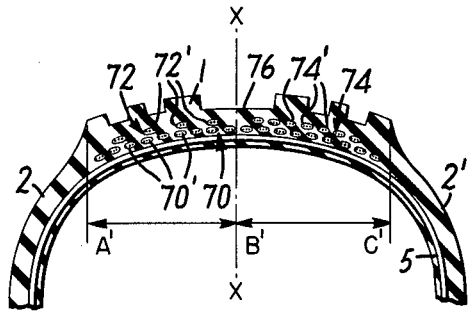
FIG. 6A    FIG. 7A
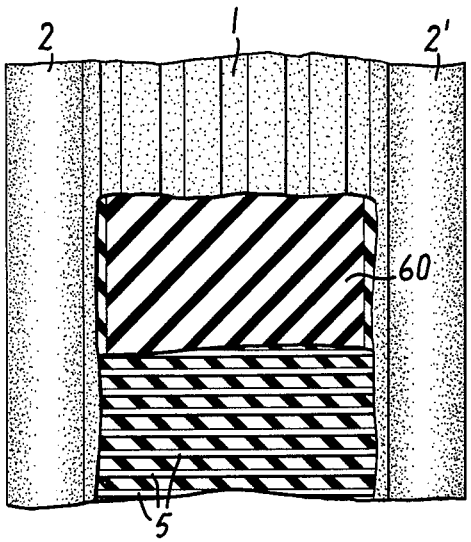
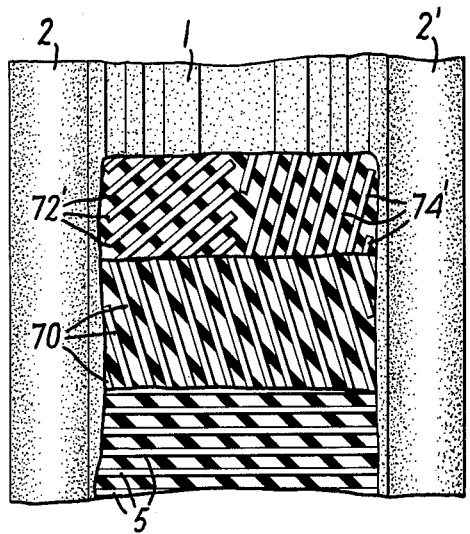
FIG. 6B    FIG. 7B United States Patent Office 3,231,000
Patented Jan. 25, 1966

1

3,231,000
PNEUMATIC TIRES
Jean-Marie Massoubre, Clermont-Ferrand, France, assignor to Compagnie Generale des Etablissements Michelin, raison sociale Michelin and Cie, Clermont-Ferrand, France
Filed Aug. 30, 1963, Ser. No. 305,747
Claims priority, application France, Sept. 3, 1962, 1,775, Patent 1,342,822
16 Claims. (Cl. 152—361)

This invention relates to pneumatic tires and, more particularly, to tires of tube-containing or tubeless types which have treads made more rigid by one or more plies of reinforcement extending over substantially the entire width of the tread.

Pneumatic tires of the above-described types have reinforcement in the treads to provide increased transverse rigidity in the tread. Such reinforcement may consist of, for example, one or more plies of cords, cables or the like made of natural or synthetic fibers or of metallic wires or strands. Another known tread reinforcing means comprises one or more plies or inserts made of an elastomer of substantially greater rigidity than that of the tread material. However, in all types of tires having reinforcement in the tread area, the reinforcement has heretofore been arranged to provide an average transverse rigidity on either side of the equatorial plane of the tire tread of substantially equal magnitude, even though it has been previously suggested that the transverse rigidity need not be uniform over the entire surface, such as for instance by dividing the tread reinforcement in three zones of varying rigidities symmetrical with respect to the equatorial plane of the tire.

In general, the results of providing tread reinforcement in tires have been excellent, particularly in improving the road-holding ability of the tires. However, it has been found that the treads of such tires, like other types of tires, show a tendency to wear unevenly, especially when the vehicle in which the tires are used is operated under conditions requiring numerous turns of comparatively small radii. One form of irregular wearing of the treads is evidenced by the formation of radial waves on their surface, which causes the tire to lose its smooth circular shape and assume a wavy shape. Additionally, the extent of the formation of the radial waves has been observed to be more pronounced on one side of the tread than on the other side.

This and other disadvantages of known forms of pneumatic tires having tread reinforcement are overcome, in accordance with the invention, by providing a novel and improved tire with a tread reinforcing means on each side of the equatorial plane of the tire, said tread reinforcing means having on one side of said plane an average rigidity substantially greater than the average rigidity of the tread reinforcing means on the other side of the plane in question. As used in this specification, the word "rigidity" applies essentially to the transverse rigidity of the tread reinforcement. It has been found that the extent of uneven wear in tires having unequal average rigidities on opposite sides of the tread, when mounted on the wheel of the vehicle such that the less rigid side of the tire is on the outside of the vehicle, is notably diminished.

It is believed that the effect of the unequal transverse rigidity on either side of the tread produces, in effect, a set of dual tires in which the tire on the outside is less rigid. Thus the advantages of two separate tires of different characteristics are obtained, in addition to providing the advantages of a single tire.

A number of means may be provided, in accordance with the invention, to make one side of the tire tread

2 more rigid than the other side, such as, for example, the following:

(1) an additional reinforcing ply of cords to one side of the tread; (2) reinforcing plies consisting of different materials on each side of the tread; (3) plies of cords of the same type but oriented on either side of the tire at different angles with respect to the equatorial plane; (4) similar cords on either side of the tire embedded in elastomers having different moduli of elasticity; or (5) a ply of an elastomer having a greater modulus of elasticity than the tread material on one side of the tread or a single elastomer layer entirely across the tread having a thickness one side of the tread greater than the thickness on the other side of the tread.

Various combinations of the examples given above may, of course, be used to provide a wide range of variation in the transverse rigidity of the tire.

Additionally, it is not necessary that all elements contributing to the transverse rigidity of each side of the tread be different, nor is it required that the difference in structure on both sides of the tire be delimited by the equatorial plane of the tire. The rigidity of each side of the tread need not be transversely uniform, but may vary, for example, in a progressive manner, such as by providing an elastomer layer of constantly varying thickness across the entire tread and of which the rigidity therefore increases from one edge to the other edge. It is, however, important that the difference in transverse rigidity does not disturb the static or dynamic equilibrium of the tire about its axis and that the structure, material or sizes of the variable elements should be relatively homogenous in the circumferential direction.

Further, in accordance with the invention, a tire in which the average transverse rigidity of the tread differs on opposite sides of the equatorial plane of the tire may also include a groove extending circumferentially around the tread, preferably centrally located, having a width of between about one eighth and one half the width of the tread. The groove provides a further and more definite division of the tire into, in effect, a set of dual tires.

For a better understanding of the invention, reference may be made to the following detailed description of exemplary embodiments, taken in conjunction with the figures of the accompanying drawings, in which:

FIGS. 2A to 7A are views in cross-section taken generally radially through other embodiments of tires in accordance with the invention; and FIGS. 2B through 7B are plan views of portions of the tires shown in FIGS. 2A to 7A, respectively, with portions broken away to show successive plies of tread reinforcement therein.

Figure 1A:
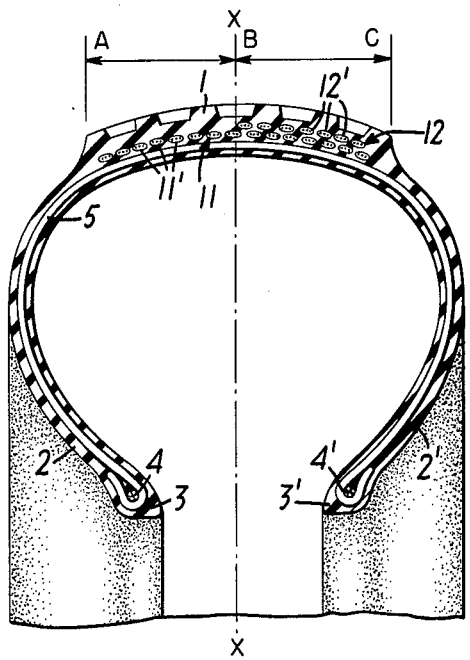
FIG. 1A is a view in cross-section taken generally radially through a tire, in accordance with the invention, wherein the tread reinforcement is transversely asymmetrical.

Referring to FIG. 1A, one form of tire casing is shown which comprises a tread 1 having sidewalls 2 and 2' extending from each side thereof and beads 3 and 3', which have the usual bead reinforcing wires 4 and 4', at the inner edge of the sidewalls 2 and 2'. A plurality of carcass reinforcing cords 5 extends between the beads 3 and 3' through the sidewalls 2 and 2' and under the tread 1 in radial planes of the tire.

The tread reinforcement comprises an inner ply 11 of cords 11' which extend diagonally across substantially the entire width of the tread and an outer ply 12 of cords 12' which lies on one side of the equatorial plane X—X of the tire in the zone B–C. Accordingly, the zone B–C of the tread in which there is an additional ply 12 is substantially more rigid than the zone A–B in which there is only a single ply 11.

Figure 1B:
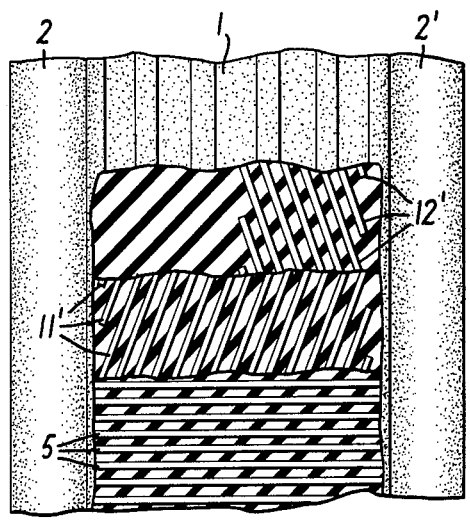
FIG. 1B is a plan view of a portion of the tire of FIG. 1A showing successive portions broken away to reveal the arrangement of tread reinforcement therein.

As shown in FIG. 1B, the cords 11' and 12' of each of the plies 11 and 12 lie generally diagonally with respect to the tread and are parallel to each other, but the cords 12' cross the cords 11', that is the cords 11' and 12', respectively, extend diagonally in different parallel planes. The planes of the cords in each ply may make the same or different angles of intersection with the equatorial plane X—X of the tire or may all lie parallel to the equatorial plane X—X and extend circumferentially about the tire.

While in the embodiment of FIGS. 1A and 1B there is an extra ply of cords in the zone of the tread on one side of the equatorial plane, the extra amount of reinforcement on one side may take the form of a single ply extending entirely across the tread, but in which there is a different number of cords on one side. Further, the cords on one side of the equatorial plane may be of larger size. The side having cords of greater size or more cords will have the greater transverse rigidity.

In each of the embodiments of FIGS. 2A to 7A the beads 3 and 3', sidewalls 2 and 2', tread 1 and radial carcass reinforcing cords 5 are substantially the same as those of the embodiment of FIG. 1. Accordingly, these elements will not be repeated in the following description of other embodiments.

Figure 2A:
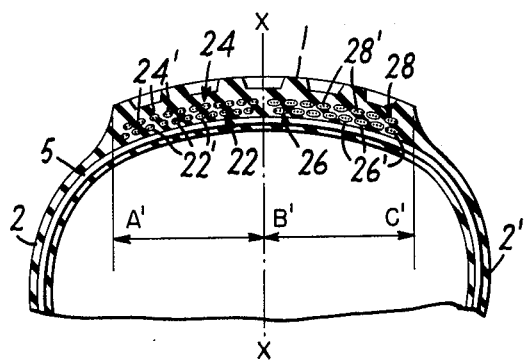
Figure 2B:
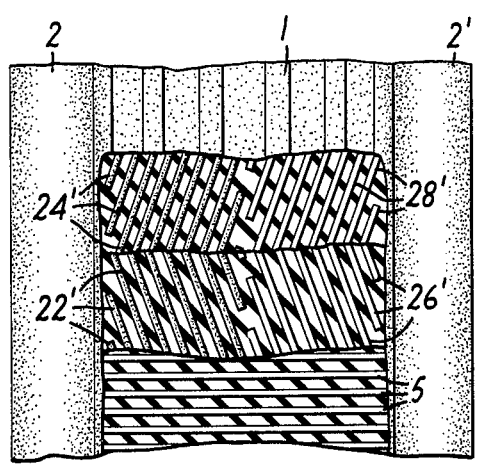

In the embodiment of FIGS. 2A and 2B, the tread 1 is reinforced in the left zone A–B by two plies 22 and 24 of rayon cords 22' and 24' and in the right zone by two plies 26 and 28 of steel cords 26' and 28'. The two plies of cords in each zone are arranged in a criss-crossing fashion and the cords in each of the plies, which lie generally parallel to each other, are arranged diagonally to make approximately the same angle with the equatorial plane X—X of the tire. Therefore, whereas the geometrical relationships between the cords of each ply and between the respective plies are approximately the same in both zones of the tread, the right zone B–C in which the cords are steel is substantially more rigid than the left zone A–B, in which the cords are rayon.

Figure 3A:
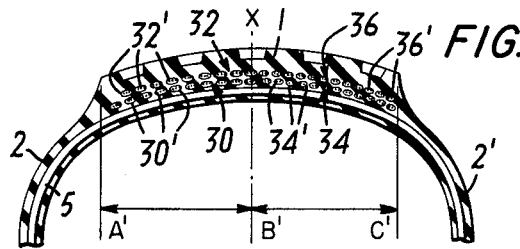
Figure 3B:
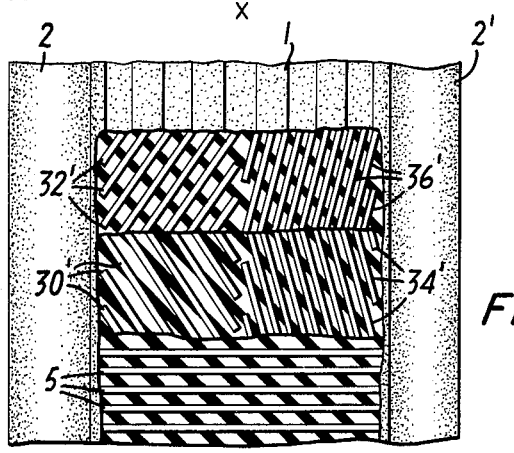

Referring to FIGS. 3A and 3B, the tread 1 of this embodiment of a tire is similarly divided into two zones A–B and B–C by the equatorial plane X—X. In the left zone A–B of the tread are two plies 30 and 32 of steel cords 30' and 32', the cords in each ply 30 and 32 lying generally parallel to each other and diagonally across the tread 1, but in opposite directions. The cords of plies 30 and 32 make an angle with the equatorial plane X—X of about 30°.

In the right hand zone B–C of the tread are two plies 34 and 36 of cords 34' and 36', which may be of the same material and size as those in the left zone. The cords of the respective plies 34 and 36 cross each other but lie in planes intersecting the equatorial plane X—X of the tire at the same angle, for example, about 15°.

Inasmuch as the cords of the plies 30 and 32 in the left zone A–B of the tread lie at a greater angle to the equatorial plane X—X than the plies 34 and 36 in the right zone B–C, the right zone B–C of the tread 1 is substantially more rigid in the transverse direction than the left zone A–B. It has been found that the angles with respect to the equatorial plane X—X of the cords in the plies in the left zone A–B of the tire may vary in the range of about 25° to 50°, while the angle of the cords in the right zone B–C may vary between about 15° and 25°, thus providing a wide range of relationship between the average transverse rigidity of the tread on either side of the equatorial plane X—X.

This range of difference in the transverse rigidity on each side of the tread may be increased still further by sheathing or embedding the cords lying at the smaller angle to the equatorial plane X—X in an elastomer which is more rigid than the elastomer in which the cords in the other zone of the tread are embedded.

Figure 4A:
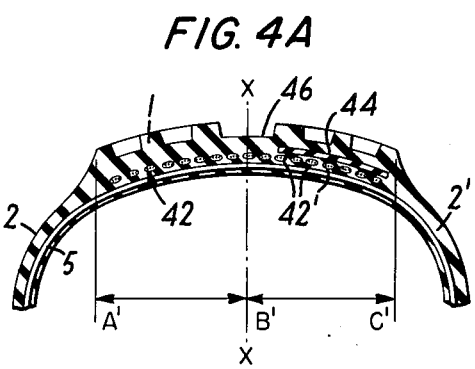
Figure 4B:
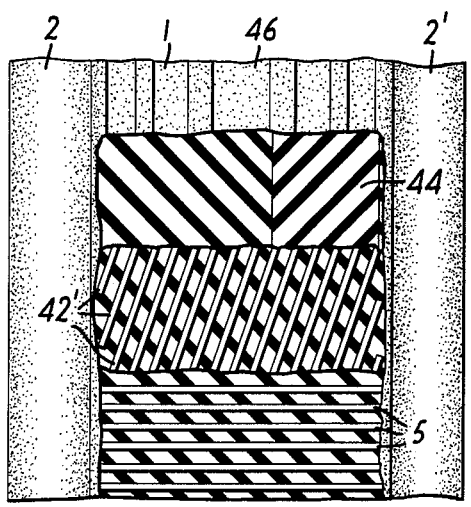

In the embodiment of FIGS. 4A and 4B the tread reinforcement consists of a ply 42 of steel cords 42' which extends substantially entirely across the tread. In the zone B–C on the right side of the equatorial plane X—X is a ply 44 consisting of an elastomer which has a greater modulus of elasticity than that of the tread material. Therfore, the zone B–C of the tread has a substantially greater average transverse rigidity than the left zone A–B.

Additionally, the tread 1 includes a centrally located groove 46 extending about the perimeter of the tire. While the groove 46 in the specific example shown in FIGS. 4A and 4B has a width equal to approximately ⅕ of the width of the tread, the width may vary between about ⅛ and about ½ of the width of the tread.

Figure 5A:
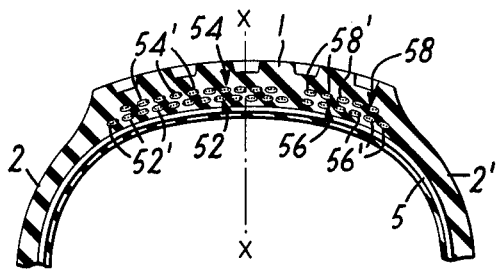
Figure 5B:
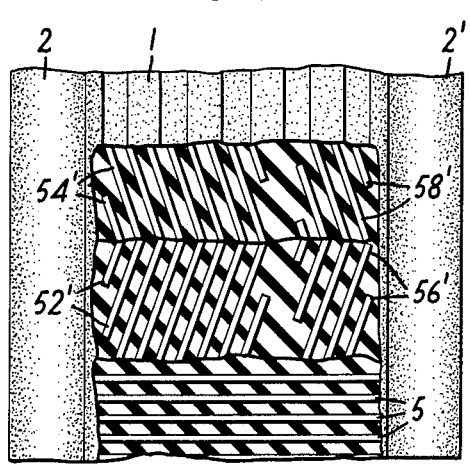

In FIGS. 5A and 5B, a difference in rigidity is obtained by providing plies 52 and 54 of a tread reinforcement which are wider than plies 56 and 58. More particularly, two crossed plies 52 and 54 of cords 52' and 54' extend from adjacent the left edge of the tread to somewhat beyond the equatorial plane X—X, and two crossed plies 56 and 58 of cords 56' and 58' extend from adjacent the right edge to a plane intermediate the right edge and the ends of the plies 52 and 54.

In FIGS. 6A and 6B the tread 1 of the tire has a single reinforcing ply 60 consisting of an elastomer having a substantially greater modulus of elasticity than that of the tread material. In order to provide a greater average transverse rigidity on the left side of the tread than on the right, the thickness of the ply 60 gradually decreases from the left edge to the right edge.

While the elastomer ply 60 in the illustrated embodiment has a uniformly varying thickness, it will be understood that the ply 60 may comprise two or more transverse portions of different thicknesses, the thickness in each portion being the same. Further, the reinforcement may consist of one or more plies on each side of the equatorial plane X—X rather than a single ply extending entirely across the tread as shown in FIGS. 6A and 6B. The side of the tread in which the elastomer ply 60 is thicker has a greater average transverse rigidity than the side in which the ply 60 is thinner.

Referring to FIGS. 7A and 7B, the embodiment illustrated therein has a ply 70 of cords 70' which extend substantially entirely across the tread and lie in parallel diagonal planes intersecting the equatorial plane X—X of the tire at an angle of about 18°. The ply 70 provides a transverse rigidity in the tread which is substantially constant from edge to edge.

In the left zone A–B of the tread 1 is a ply 72 comprising parallel cords 72' lying in diagonal planes at angles of approximately 50° to the equatorial plane X—X. A ply 74 in the right zone B–C consists of cords 74' lying at angles of approximately 16° to the equatorial plane X—X. The plies 72 and 74, respectively, provide additional increases in the transverse rigidity of the tread, which, however, are unequal in the respective zones A–B and B–C. The average transverse rigidity of the zone A–B having the ply 72 in which the cords 72' lie at the greater angle to the equatorial plane X—X is less than that in the zone B–C in which the cords 74' lie at a smaller angle to the equatorial plane X—X.

In the embodiment of the tire of FIGS. 7A and 7B, there is also a groove 76 having a width of about ¼ of the tread width extending circumferentially around the outer surface of the tread.

It will be understood by those skilled in the art, that the embodiments of the invention described above are merely exemplary and that considerable modifications and variations may be made therein. For example, the specific tread reinforcement shown in each of the embodiments may exist in various combinations, thereby permitting a wide range of differences between the magnitude of the transverse rigidity of the tread on each side of the equatorial plane of the tire. Further, the cords in the tread reinforcing plies need not be straight throughout their length, but may be curving or otherwise varying in alignment. It is intended that such variations and modifications be included within the scope of the appended claims.

I claim:

1. A pneumatic tire, comprising a carcass, a tread on said carcass, and tread reinforcing means extending over substantially the entire width of the tread and including two transversely adjacent portions disposed on opposite sides of a plane normal to the tire axis and lying between the edges of said tread, one of said two portions extending from one edge of the tread to said plane and the other of said portions extending from the other edge of said tread to said plane, and said tread reinforcng means in one portion having a substantially lower rigidity than that in the other portion.

2. A pneumatic tire, comprising a carcass, a tread on said carcass, first tread reinforcing means extending from one edge of said tread to the equatorial plane of the tire, and second tread reinforcing means extending from the other edge of said tread to the equatorial plane of the tire, said first tread reinforcng means having an average transverse rigidity substantially different from the average transverse rigidity of said second tread reinforcing means.

3. The tire as claimed in claim 2 wherein said first means is made from a material having a lower modulus of eleasticity than that of the material of said second means.

4. The tire as claimed in claim 2, wherein said first means comprises a predetermined quantity of a material, and said second means comprises a substantially greater quantity of the same material.

5. The tire as claimed in claim 2, wherein said first means comprises at least one ply of cords, the cords in said ply being generally aligned to form a first angle with the equatorial plane, and said second means comprises at least one ply of cords, the cords in said ply being generally aligned to make a substantially smaller angle with said equatorial plane than said first angle.

6. The tire as claimed in claim 5 wherein said first angle is between about 25° and about 50° and said smaller angle is between about 15° and about 25°.

7. A pneumatic tire, comprising a carcass, a tread on said carcass, at least one ply of first tread reinforcing means extending over substantially the entire width of said tread, and at least one ply of second reinforcing means disposed in the zone of the tread lying on one side only of the equatorial plane of the tire.

8. The tire as claimed in claim 7, wherein each of said first and second reinforcing means comprises a plurality of cords.

9. The tire as claimed in claim 7, wherein said first reinforcing means comprises a plurality of cords and said second reinforcng means comprises an elastomer having a greater modulus of elasticity than that of the elastomer of the tread.

10. A pneumatic tire, comprising a carcass, a tread on said carcass, and at least one ply of elastomeric material having a modulus of elasticity substantially greater than that of the remainder of said tread, said ply having an average thickness on one side of the equatorial plane substantially greater than the average thickness on the other side of the equatorial plane.

11. A pneumatic tire, comprising a carcass, a tread on said carcass, at least one ply of cords in the tread and extending over substantially the entire width of the tread, said cords generally aligned to form angles with the equatorial plane of about 18°, at least one ply of cords in the tread and lying generally on one side of the equatorial plane of the tire, said cords aligned generally to form angles of about 50° with the equatorial plane, and at least one ply of cords in said tread and lying generally on the other side of the equatorial plane, said cords aligned generally to form angles with the equatorial plane of about 16°.

12. A pneumatic tire, comprising a carcass, a tread on said carcass, at least one ply of cords in said tread and on one side of the equatorial plane of the tire, and at least one ply of cords in said tread and on the other side of said equatorial plane, said plies extending from the edges of the tread, the inner ends of said plies being disposed substantially adjacent each other, the cords on one side of the equatorial plane being made of a first material and the cords on the other side of the equatorial plane being made of a material different from said first material.

13. A pneumatic tire, comprising a carcass, a tread on said carcass, at least one ply of cords in said tread extending from adjacent one edge of said tread to a first longitudinal plane normal to the tire axis on the opposite side of the equatorial plane with respect to said one edge and spaced a substantial distance from the equatorial plane, and at least one ply of cords in said tread extending from adjacent the other edge of said tread to a second longitudinal plane parallel to said first longitudinal plane and lying intermediate said other edge and said first longitudinal plane said plies imparting substantially different transverse rigidities to the tire in the respective areas in which they are located.

14. A pneumatic tire, comprising a carcass, a tread on said carcass, and a generally centrally located circumferential groove of a width equal to between about one-eighth and about one-half of the width of the tread, said tread having reinforcing means on each side of the equatorial plane of said tire, said reinforcing means extending over substantially the entire width of the tread and having an average rigidity on one side of said plane substantially greater than the average rigidity of the reinforcing means on the other side of said plane.

15. A pneumatic tire, comprising a carcass, a tread on said carcass, at least one ply of cords in the tread extending over substantially the entire width of the tread, at least one additional ply of cords on each side of the equatorial plane of the tire, the cords of said at least one ply on one side of said plane making a substantial angle with the cords of said at least one ply on the other side of said plane.

16. A pneumatic tire as claimed in claim 15, wherein a circumferential groove of a width equal to between about one-eighth and about one-half of the width of the tread is located generally centrally of said tread.

References Cited by the Examiner

UNITED STATES PATENTS

| | | | |
|---|---|---|---|
| 1,363,300 | 12/1920 | Yohn | 152—209 X |
| 3,057,392 | 10/1962 | Nallinger | 152—361 |

ARTHUR L. LA POINT, *Primary Examiner.*